United States Patent
Downing

(10) Patent No.: US 9,775,327 B2
(45) Date of Patent: Oct. 3, 2017

(54) ANIMAL-IDENTIFYING BAND ASSEMBLY

(71) Applicant: ILLINOIS TOOL WORKS INC., Glenview, IL (US)

(72) Inventor: Mark Downing, Oakwood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 410 days.

(21) Appl. No.: 14/355,921

(22) PCT Filed: Nov. 5, 2012

(86) PCT No.: PCT/US2012/063542
§ 371 (c)(1),
(2) Date: May 2, 2014

(87) PCT Pub. No.: WO2013/070544
PCT Pub. Date: May 16, 2013

(65) Prior Publication Data
US 2014/0283423 A1  Sep. 25, 2014

Related U.S. Application Data

(60) Provisional application No. 61/556,399, filed on Nov. 7, 2011.

(51) Int. Cl.
*G09F 3/00* (2006.01)
*A01K 11/00* (2006.01)

(52) U.S. Cl.
CPC ............. *A01K 11/00* (2013.01); *G09F 3/005* (2013.01)

(58) Field of Classification Search
CPC .................................................... A01K 35/00
USPC ........................................... 40/300, 304, 633
See application file for complete search history.

(56) References Cited

U.S. PATENT DOCUMENTS

| 2,341,608 | A |   | 2/1944  | Gey |
|-----------|---|---|---------|-----|
| 4,038,726 | A | * | 8/1977  | Takabayashi ............... 24/198 |
| 5,176,106 | A | * | 1/1993  | Casto et al. ................ 119/865 |
| 5,323,554 | A |   | 6/1994  | MacDonald |
| 5,979,095 | A | * | 11/1999 | Schneider et al. ............ 40/633 |
| 8,166,685 | B2 |  | 5/2012  | Mouille |
| 2003/0221343 | A1 | * | 12/2003 | Volk et al. .................. 40/300 |
| 2009/0320770 | A1 | * | 12/2009 | Rolain et al. ............... 119/858 |

(Continued)

FOREIGN PATENT DOCUMENTS

| EP | 2077071 A1 | 7/2009 |
| WO | 00/65531 A2 | 11/2000 |

OTHER PUBLICATIONS

ISR for PCT/US2012/063542 dated Mar. 21, 2013.

*Primary Examiner* — Shin Kim
(74) *Attorney, Agent, or Firm* — Joseph M. Butscher; The Small Patent Law Group, LLC

(57) ABSTRACT

An animal-identifying assembly is configured to be selectively secured to and removed from an animal. The assembly may include an identifying band configured to be wrapped around a portion of an animal. The identifying band may include at least one protuberance proximate a first end and at least one reciprocal aperture proximate a second end. The aperture(s) is configured to receive and retain the protuberance(s). The assembly also includes a securing strap configured to be selectively secured to, and removed from, the identifying band. The securing strap and the identifying band are configured to be reused.

17 Claims, 4 Drawing Sheets

(56) References Cited

U.S. PATENT DOCUMENTS

2010/0024174 A1* 2/2010 Gelibert et al. ............ 24/20 EE
2010/0031542 A1   2/2010 Mouille

* cited by examiner

ANIMAL-IDENTIFYING BAND ASSEMBLY

RELATED APPLICATIONS

This application relates to and claims priority benefits from U.S. Provisional Patent Application No. 61/556,339 entitled "Animal-Identifying Band Assembly," filed Nov. 7, 2011, which is hereby incorporated by reference in its entirety.

FIELD OF EMBODIMENTS OF THE DISCLOSURE

Embodiments of the present disclosure generally relate to an identifying device, and more particularly, to a band assembly configured to identify an animal, such as ovine, caprine, bovine, equine, or the like.

BACKGROUND

In the farming industry, large numbers of animals may be penned, housed, or otherwise grouped together. For example, a high density cattle pen may include hundreds, if not thousands, of individual cattle. In many cases, the animals within a pen or the like may be branded or otherwise identified.

Often, a leg band is used to identify an animal having a temporary condition, such as a sickness, or recent acquisition into a heard. Some leg bands include a Velcro strap allowing the leg band to be selectively removed and secured from a particular animal. However, in wet, dirty environments, the Velcro may degrade over time, and the leg band may be lost.

Another type of identifying device includes a flat, planar strip that is wrapped around a leg of a particular animal. The strip may include a laser or ink marker and/or an electronic transponder or RFID tag used to identify and track the animal. The strip may be wrapped around the leg of the animal such that latching projections are aligned. Latching pins or stems are then urged into the latching projections to lock the strip in place. After the latching pins are urged into the latching projections, the gripping heads of the stems are broken off. In this manner, the strip is secured to the leg. In order to remove the strip, the strip itself is typically cut, thereby rendering the strip inoperable for further use.

SUMMARY OF EMBODIMENTS OF THE DISCLOSURE

Certain embodiments of the present disclosure provide an animal-identifying assembly configured to be selectively secured to and removed from an animal. The assembly may include an identifying band configured to be wrapped around a portion of an animal. The identifying band may include at least one protuberance proximate a first end and at least one reciprocal aperture proximate a second end. The aperture(s) is configured to receive and retain the protuberance(s). The assembly may also include a securing strap configured to be selectively secured to, and removed from, the identifying band. The securing strap and the identifying band are configured to be reused.

In an embodiment, the protuberance(s) include pairs of aligned protuberances. The securing strap is configured to be secured between the pairs of aligned protuberances.

The securing strap may include a band-engaging beam integrally connected to a covering beam through a hinge. The band-engaging beam may be configured to be secured to the covering beam around a portion of the identifying band. One of the band-engaging beam or the covering beam may include a latch housing and the other of the band-engaging beam or the covering beam may include a latch member. The latch housing may be configured to receive and retain the latch member when the securing strap is in a fully-secured or closed position.

The securing strap may include one or more band-engaging members configured to slidably secure to at least one outer edge of the identifying band.

The identifying band may include an identifying component. For example, the identifying component may be an RFID tag embedded within the band.

Certain embodiments of the present disclosure provide an animal-identifying assembly configured to be selectively secured to and removed from an animal. The assembly may include an identifying band configured to be wrapped around a portion of an animal. The identifying band may include protuberances spaced apart from one another with respect to a longitudinal axis of the identifying band, and reciprocal apertures spaced apart from another with respect to the longitudinal axis. Each of the reciprocal apertures may be configured to receive and retain any of the protuberances. The assembly may also include a securing strap configured to be selectively secured to, and removed from, the identifying band. The securing strap is configured to slidably engage the identifying band when the securing strap is in an open position. The securing strap is further configured to be securely lodged between neighboring protuberances when the securing strap is in a closed position. Further, the securing strap and the identifying band are configured to be reused.

Figure 1:
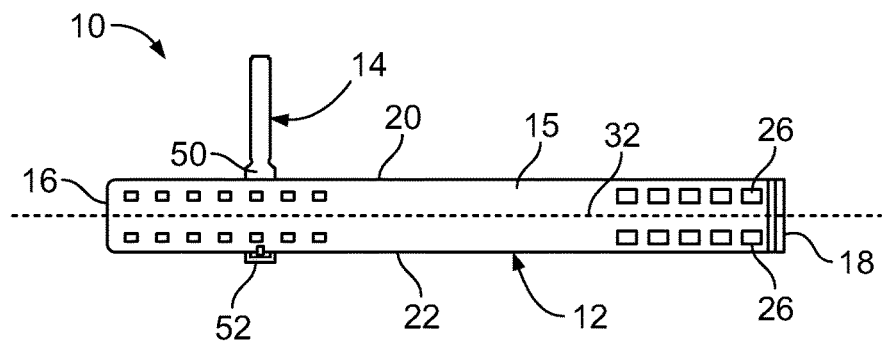
FIG. 1 illustrates a top plan view of an animal-identifying assembly in a flat, unsecured state, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Figure 2:
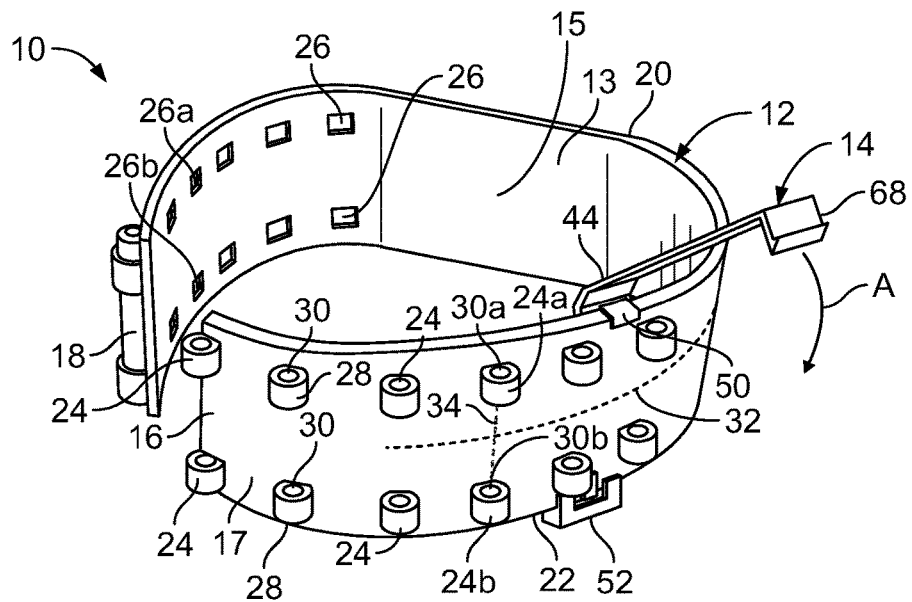
FIG. 2 illustrates an isometric view of an animal-identifying assembly in a wrapped, unsecured state, according to an embodiment of the present disclosure.

FIG. 1 illustrates a top plan view of an animal-identifying assembly 10 in a flat, unsecured state, according to an embodiment of the present disclosure. FIG. 2 illustrates an isometric view of the animal-identifying assembly 10 in a wrapped, unsecured state. Referring to FIGS. 1 and 2, the assembly 10 includes a flexible, planar band 12 and a securing strap 14 slidably secured to the band 12. The band 12 may include an identifying component 13, such as a laser or ink marker and/or an embedded electronic transponder or RFID tag used to identify and track an animal. The band 12 and the strap 14 may be formed of resilient, flexible materials, such as plastic, rubber, or the like. Alternatively, the band 12 and/or the strap 14 may be formed of a flexible, resilient metal.

The band 12 includes a planar interior surface 15 opposite a planar outer surface 17. The band 12 includes opposed ends 16 and 18 integrally connected to opposed lateral edges 20 and 22.

As shown in FIG. 2, in particular, the band 12 includes a plurality of aligned connection protuberances 24, such as tabs, barbs, posts, bumps, latches, clasps, or the like, extending outwardly from the outer surface 17 proximate the end 16. A plurality of aligned apertures 26 are formed through the band 12 proximate the end 18. Each connection protuberance 24 may include a cylindrical wall 28 extending outwardly from the outer surface 17. The cylindrical wall 28 may define a passage 30 therethrough. Each passage 30 may be perpendicularly-oriented to a longitudinal axis 32 of the band 12.

Pairs of protuberances 24 may be aligned with one another. For example, protuberances 24a and 24b may be vertically-aligned with one another, such that respective openings 30a and 30b are aligned to provide a cylindrical envelope therebetween. That is, a straight cylindrical path may be defined between the aligned openings 30a and 30b.

The protuberances 24 are configured to be received and retained by the aligned apertures 26 formed proximate the end 18 of the band 12. The band 12 may be manipulated so that the ends 16 and 18 overlap one another, and the protuberances 24a and 24b may be aligned with any pair of aligned apertures 26. For example, the protuberances 24a and 24b may be configured to be inserted into and through the apertures 26a and 26b, respectively.

While the band 12 is shown and described having aligned cylindrical protuberances 24, the band 12 may include more or less protuberances 24 and apertures 26 than those shown. For example, instead of pairs of aligned protuberances 24 and apertures 26, the band 12 may simply include single protuberances and apertures positioned at or about the longitudinal axis 32. Further, the protuberances 24 may be various other shapes and sizes, such as rectangular, that define various other shaped openings. Also, the protuberances 24 may or may not include openings.

In operation, an individual may wrap the band 12 around a leg of an animal. At a desired circumference, diameter, and tightness, the individual may secure aligned protuberances 24 into aligned apertures 26. The individual then secures the band 12 in position through the securing strap 14.

Figure 3:
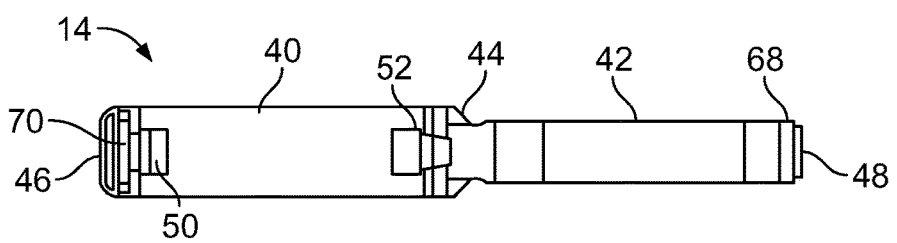
FIG. 3 illustrates a top view of a securing strap, according to an embodiment of the present disclosure.
Figure 4:
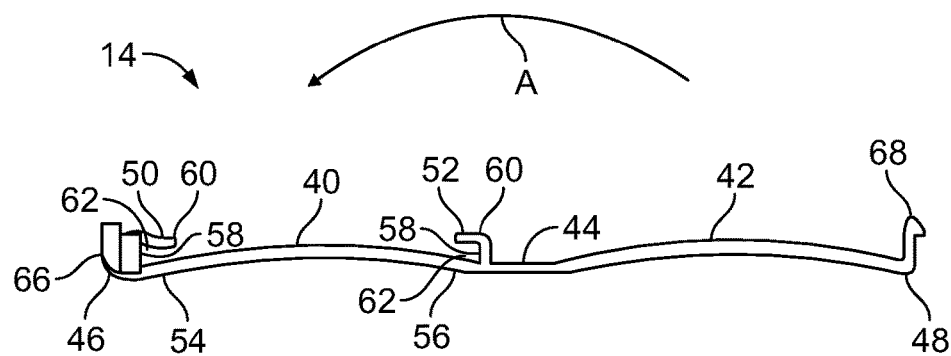
FIG. 4 illustrates a side view of a securing strap, according to an embodiment of the present disclosure.
Figure 5:
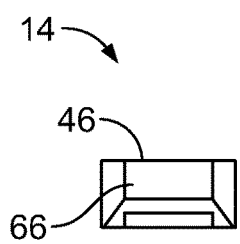
FIG. 5 illustrates a view of a securing strap from a first end, according to an embodiment of the present disclosure.
Figure 6:
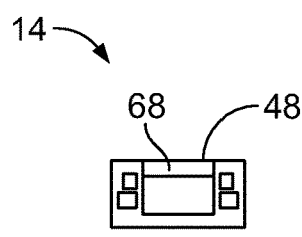
FIG. 6 illustrates a view of a securing strap from a second end, according to an embodiment of the present disclosure.
Figure 7:
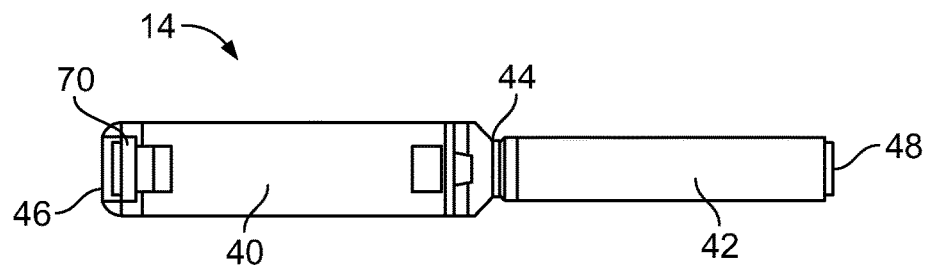
FIG. 7 illustrates a bottom view of a securing strap, according to an embodiment of the present disclosure.

FIGS. 3 and 4 illustrates top and lateral views, respectively, of the securing strap 14, according to an embodiment of the present disclosure. FIGS. 5 and 6 illustrate first and second end 46 and 48 views, respectively, of the securing strap 14. FIG. 7 illustrates a bottom view of the securing strap 14.

Referring to FIGS. 3-7, the securing strap 14 includes a band-engaging beam 40 integrally connected to a covering beam 42 by a flexible hinge 44. The band-engaging beam 40 includes opposed band-engaging members 50 and 52 upwardly extending from opposite ends 54 and 56, respectively. The band-engaging members 50 and 52 may include hooks, clasps, latches, or the like. Each band-engaging member 50 and 52 includes an extension wall 58 integrally connected to a retaining wall 60, which may be generally perpendicular to the extension wall 58. An edge-retaining channel 62 is defined between the extension wall 58 and the retaining wall 60. The band-engaging members 50 and 52 are sized to fit around the lateral edges of the band 12 (shown in FIGS. 1 and 2). Therefore, the securing strap 14 may be slidably secured to the band 12 prior to the securing strap 14 being securely latched around the band 12. Optionally, the band-engaging members 50 and 52 may be formed on the covering beam 42. Further, the securing strap 14 may include more or less band-engaging members than those shown. Alternatively, the securing strap 14 may not include the band-engaging members 50 and 52.

A latch housing 66 extends from the end 46 opposite the band-engaging member 52. The latch housing 66 may include a slot 70, opening, or the like configured to receive and latchably retain a latch member 68 that extends from the covering beam 42 at the opposite end 48 of the securing strap 14. The latch member 68 may include a tab, post, barb, clasp, or the like, that is configured to be securely retained by the latch housing 66. Alternatively, the latch housing 66 may be at the end 48, while the latch member 68 may be at the end 46.

Referring to FIGS. 1-7, in operation, the securing strap 14 is positioned on the band 12 so that the band-engaging beam 40 abuts into the interior surface 15 of the band 12. The band-engaging members 50 and 52 are positioned at opposite edges 20 and 22, respectively, of the band 12. The edges 20 and 22 are slidably retained within the edge-retaining channels 62 defined by the extension walls 58 and the retaining walls 50. Accordingly, in the pre-latched position, the securing strap 14 may be slid about the edges 20 and 22 of the band 12 through directions that are parallel to the longitudinal axis 32 of the band 12.

After the ends 16 and 18 of the band 12 have been wrapped to a desired tightness, and the protuberances 24 are inserted into and through reciprocal apertures 26, the covering beam 42 is pivoted over the outer surface 17 of the band 12 about the hinge 44 in the direction of arrow A (shown in FIGS. 2 and 4). The covering beam 42 is pivoted with respect to the hinge 44 until the latch member 68 is securely retained within the slot 70 of the latch housing 66, thereby securing the latch member 68 to the latch housing 66. As such, the securing strap 14 is securely fastened around the band 12 between pairs of protuberances 24 extending through reciprocal apertures 26. In the secured position, the covering beam 42 is trapped between the pairs of the protuberances 24, and is therefore prevented from sliding over the band 12 in directions parallel to the longitudinal axis 32 of the band 12. Accordingly, the band 12 is secured in position by the securing strap 14, and the animal-identifying band assembly 10 may be securely fastened to a portion of an animal.

Unlike previous devices, however, the assembly 10 may be reused. For example, in order to remove the assembly 10, an individual simply disconnects the latch member 68 from the latch housing 66. For example, the individual may bias the latch member 68 inwardly or outwardly with respect to the slot 70, in order to remove the latch member 68 from the latch housing 66. In this manner, the securing strap 14 may be selectively engaged between secured and unsecured states, and repeatedly reused.

As described above, the band-engaging beam 40 may engage the interior surface 15 of the band 12, while the covering beam 42 engages the outer surface 17. However, the covering beam 42 may engage the inner surface 15, while the band-engaging beam 40 may engage the outer surface 17, and the band-engaging beam 40 may be pivoted with respect to the covering beam 42.

Figure 8:
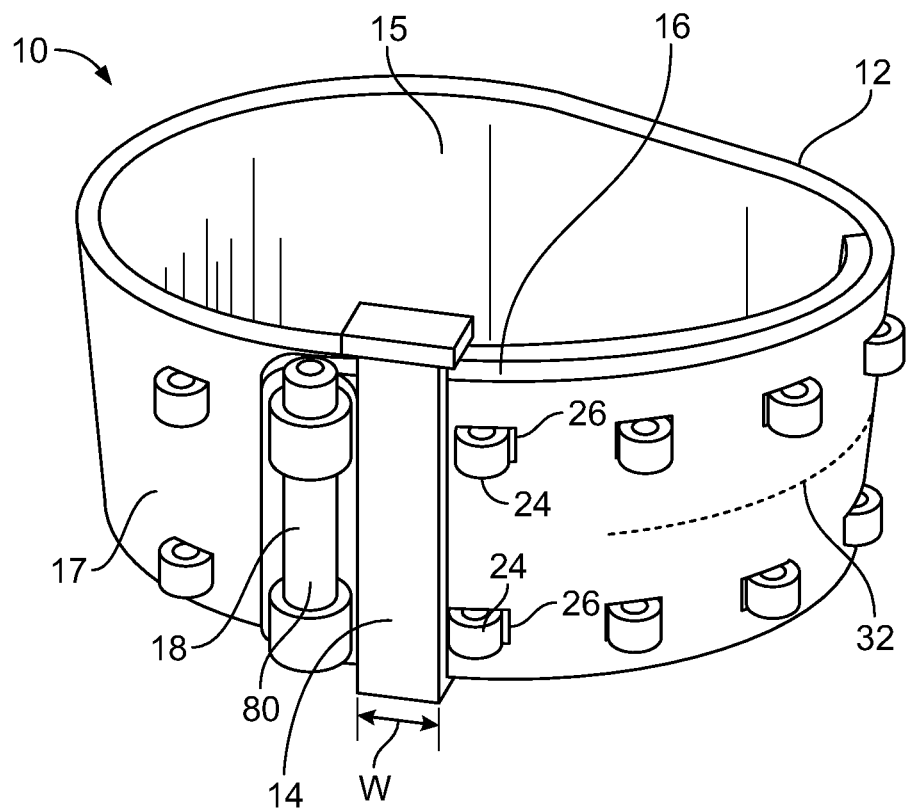
FIG. 8 illustrates an isometric view of an animal-identifying assembly in a wrapped, secured state, according to an embodiment of the present disclosure.

FIG. 8 illustrates an isometric view of the animal-identifying assembly 10 in a wrapped, secured state, according to an embodiment of the present disclosure. As shown in FIG. 8, the band 12 has been wrapped to a desired diameter and circumference such that protuberances 24 extend through reciprocal apertures 26. The securing strap 14 has been securely fastened between protuberances 24 extending through the apertures 26 and an end stop 80 of the band 12. The width w of the securing strap 14 may be similar to the distance between horizontally-spaced protuberances 24 and/or the horizontal distance between the end stop 80 and the outer-most protuberances 24. Accordingly, when the securing strap 14 is securely clamped around the band 12, the securing strap 14 provides a secure connection between the ends 16 and 18 of the band 12, and prevents the protuberances 24 from ejecting from the apertures 26. Moreover, end stop 80 and the protuberances 24 provide bathers past which the securing strap 14 is unable to move when in the fully-secured position, as shown in FIG. 8. Accordingly, when in the fully-secured position, the securing strap 14 ensures that the band 12 remains securely connected at a desired diameter and circumference, and prevents the band 12 from axially slipping with respect to the longitudinal axis 32.

In the fully-secured, closed position, the securing strap 14 may be securely lodged, wedged, or otherwise secured between neighboring protuberances 24, such as protuberances 24 immediately next to one another with respect to the longitudinal axis 32 of the band 12. Optionally, as shown, the in the fully-secured position, the securing strap 14 may be secured between the end stop 80 and a neighboring set of protuberances 24 (for example, the protuberances 24 immediately next to the end stop 80 with respect to the longitudinal axis 32 of the band 12.

As noted above, the securing strap 14 may be selectively opened and fastened. Therefore, the assembly 10 may be readjusted at any point by simply engaging the securing strap 14, as described above.

Figure 9:
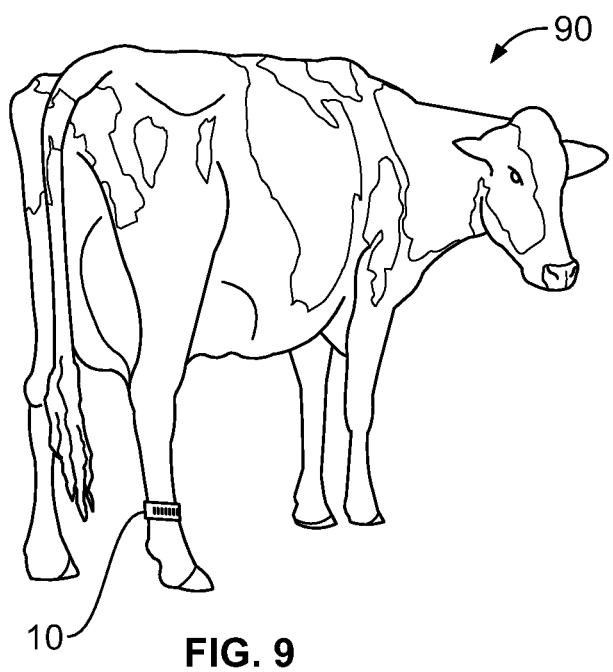
FIG. 9 illustrates an animal-identifying assembly secured to a portion of an animal, according to an embodiment of the present disclosure.

FIG. 9 illustrates the animal-identifying assembly 10 secured to a portion of an animal 90, according to an embodiment of the present disclosure. For example, the assembly 10 may be secured to a leg of a cow.

Referring to FIGS. 1-9, in order to secure the band assembly 10 to the animal 90, the band 12 is wrapped around the leg (for example) of the animal to a desired tightness. Protuberances 24 extending from the band 12 are then positioned through reciprocal apertures 26. Instead of using breakable pins, however, the securing strap 14 is used to secure the band 12 to the leg of the animal 90. The securing strap 14 is slid into position over directions that are parallel with the longitudinal axis 32 of the band 12. Once in a desired position between longitudinally-spaced protuberances 24 (and/or the end stop 80), the covering beam 42 is pivoted about the hinge 44 into a closing position. The securing strap 14 is then securely latched around the band 12. The securing strap 14 may be selectively manipulated between closed and open positions. In this manner, the assembly 10, including the band 12 and the securing strap 14, may be re-used.

Figure 10:
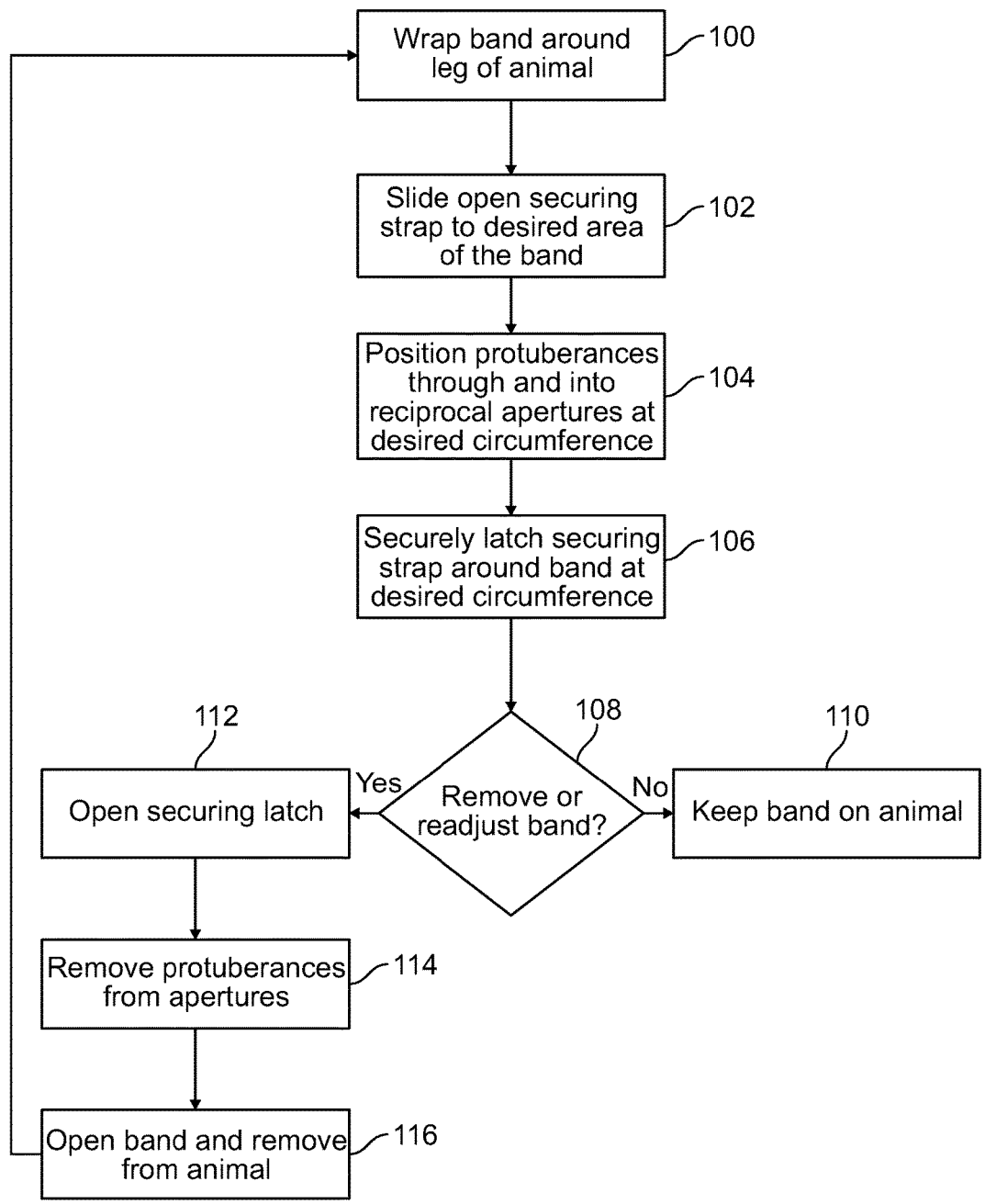
FIG. 10 illustrates a flow chart of a method of securing an animal-identifying band to an animal, according to an embodiment of the present disclosure.

FIG. 10 illustrates a flow chart of a method of securing an animal-identifying band to an animal, according to an embodiment of the present disclosure. At 100, a band, such as the band 12, is wrapped around a leg, for example, of an animal Next, at 102, an open securing strap 14, such as shown in FIGS. 1 and 2, is slid to a desired area on the band. At 104, protuberances extending from the band are then positioned through reciprocal apertures so that the band is at a desired circumference and tightness on the animal. Next, at 106, the securing strap is securely latched around the band at the desired circumference and tightness, thereby securing the band in place on the animal.

At 108, an individual determines whether the band should be readjusted or removed. If not, then the method proceeds to 110, in which the band remains on the animal. If, however, the band is to be removed or readjusted, then at 112, the securing latch is opened, such as by removing a securing tab from a slot. Then, at 114, the protuberances are removed from the apertures. At 116, the band is then opened and removed from the animal. The process may then return to 110, in which the band may be secured to the same or different animal.

Thus, embodiments of the present disclosure provide an animal-identifying band assembly that may include an identifying component, such as an RFID tag, that is configured to be removably secured to a portion of an animal Because the assembly is removably secured to the animal, the assembly may be reused. The securing strap secured to the band allows the band to be selectively secured to and removed from a leg without being damaged or otherwise rendered inoperable for further use. The removable securing strap of the assembly may be used in place of solid plastic stems, such as shown in U.S. 2010/0031542, entitled "Identifying Animals" Thus, the securing strap may be easily removed from the band without damaging the band or otherwise rendering the band inoperable for further use.

The band and/or the securing strap of the assembly may be bar coded, embedded with an RFID tag, or the like, in order to quickly and easily identify if the band was removed or replaced. Embodiments provide an animal-friendly assembly that may be quickly and easily secured to and removed from an animal. Embodiments may include assemblies having RFID tags, chips, or the like that may be used with RFID-compliant readers.

Embodiments of the present disclosure allow for the temporary identification of an animal having a temporary condition. Additionally, embodiments of the present disclosure provide a reusable assembly, including the band and the securing strap.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. An animal-identifying assembly configured to be selectively secured to and removed from an animal, the animal-identifying assembly comprising:
an identifying band configured to be wrapped around a portion of an animal, the identifying band including at least one protuberance proximate a first end and at least one reciprocal aperture proximate a second end, wherein the at least one aperture is configured to receive and retain the at least one protuberance; and
a securing strap that is selectively secured to, and removed from, the identifying band, wherein the securing strap and the identifying band are reusable.

2. The animal-identifying assembly of claim 1, wherein the at least one protuberance comprises pairs of aligned protuberances, and wherein the securing strap is configured to be secured between the pairs of aligned protuberances.

3. The animal-identifying assembly of claim 1, wherein the securing strap comprises a band-engaging beam integrally connected to a covering beam through a hinge, and wherein the band-engaging beam is configured to be secured to the covering beam around a portion of the identifying band.

4. The animal-identifying assembly of claim 3, wherein one of the band-engaging beam or the covering beam comprises a latch housing and the other of the band-engaging beam or the covering beam comprises a latch member, wherein the latch housing is configured to receive and retain the latch member when the securing strap is in a fully-secured position.

5. The animal-identifying assembly of claim 1, wherein the securing strap comprises one or more band-engaging members configured to slidably secure to at least one outer edge of the identifying band.

6. The animal-identifying assembly of claim 1, wherein the identifying band comprises an identifying component.

7. The animal-identifying assembly of claim 6, wherein the identifying component comprises an RFID tag embedded within the identifying band.

8. An animal-identifying assembly configured to be selectively secured to and removed from an animal, the animal-identifying assembly comprising:
an identifying band configured to be wrapped around a portion of an animal, the identifying band including protuberances spaced apart from one another with respect to a longitudinal axis of the identifying band, and reciprocal apertures spaced apart from another with respect to the longitudinal axis, wherein each of the reciprocal apertures is configured to receive and retain any of the protuberances; and
a securing strap selectively secured to, and removed from, the identifying band, wherein the securing strap slidably engages the identifying band when the securing strap is in an open position, wherein the securing strap is securely lodged between neighboring protuberances when the securing strap is in a closed position, and wherein the securing strap and the identifying band are reusable.

9. The animal-identifying assembly of claim 8, wherein the protuberances comprise pairs of aligned protuberances, and wherein the securing strap is configured to be secured between the pairs of aligned protuberances when the securing strap is in the closed position.

10. The animal-identifying assembly of claim 8, wherein the securing strap comprises a band-engaging beam integrally connected to a covering beam through a hinge, and wherein the band-engaging beam is configured to be secured to the covering beam around a portion of the identifying band.

11. The animal-identifying assembly of claim 10, wherein one of the band-engaging beam or the covering beam comprises a latch housing and the other of the band-engaging beam or the covering beam comprises a latch member, and wherein the latch housing is configured to receive and retain the latch member when the securing strap is in the closed position.

12. The animal-identifying assembly of claim 8, wherein the securing strap comprises one or more band-engaging members configured to slidably secure to at least one outer edge of the identifying band.

13. The animal-identifying assembly of claim 8, wherein the identifying band comprises an identifying component.

14. The animal-identifying assembly of claim 13, wherein the identifying component comprises an RFID tag embedded within the identifying band.

15. An animal-identifying assembly configured to be selectively secured to and removed from an animal, the animal-identifying assembly comprising:
an identifying band configured to be wrapped around a portion of an animal, the identifying band including aligned pairs of protuberances spaced apart from one another with respect to a longitudinal axis of the identifying band, and aligned pairs of reciprocal apertures spaced apart from another with respect to the longitudinal axis, wherein each of the aligned pairs of reciprocal apertures is configured to receive and retain any of the aligned pairs of protuberances; and
a securing strap selectively secured to, and removed from, the identifying band, wherein the securing strap slidably engages the identifying band when the securing strap is in an open position, wherein the securing strap is be securely lodged between neighboring aligned pairs of protuberances when the securing strap is in a closed position, and wherein the securing strap and the identifying band are reusable, wherein the securing strap includes:
a band-engaging beam integrally connected to a covering beam through a hinge, and wherein the band-engaging beam is configured to be secured to the covering beam around a portion of the identifying band, wherein one of the band-engaging beam or the covering beam comprises a latch housing and the other of the band-engaging beam or the covering beam comprises a latch member, and wherein the latch housing is configured to receive and retain the latch member when the securing strap is in the closed position; and one or more band-engaging members configured to slidably secure to at least one outer edge of the identifying band.

16. The animal-identifying assembly of claim 15, wherein the identifying band comprises an identifying component.

17. The animal-identifying assembly of claim 16, wherein the identifying component comprises an RFID tag embedded within the identifying band.

* * * * *